United States Patent [19]

Halgrimson

[11] Patent Number: 4,573,115
[45] Date of Patent: Feb. 25, 1986

[54] SUPERVISORY CONTROL SYSTEM FOR REMOTELY MONITORING AND CONTROLLING AT LEAST ONE OPERATIONAL DEVICE

[75] Inventor: Edwin A. Halgrimson, Naperville, Ill.

[73] Assignee: Standard Oil Company (Indiana), Chicago, Ill.

[21] Appl. No.: 546,622

[22] Filed: Oct. 28, 1983

[51] Int. Cl.$^4$ .............................................. G06F 15/46
[52] U.S. Cl. ............................... 364/138; 340/825.06; 364/509
[58] Field of Search ............... 364/138, 139, 131, 132, 364/133, 134, 135, 509, 550, 551, 200 MS File, 900 MS File; 340/825.06, 825.07, 825.08, 825.15, 825.54, 870.01, 870.11, 870.16

[56] References Cited

U.S. PATENT DOCUMENTS

| | | | |
|---|---|---|---|
| 4,005,387 | 1/1977 | Herring et al. | 364/139 X |
| 4,074,354 | 2/1978 | Nakagawa et al. | 364/139 X |
| 4,161,782 | 7/1979 | McCracken | 364/138 X |
| 4,180,860 | 12/1979 | Driscoll et al. | 364/139 |
| 4,234,926 | 11/1980 | Wallace et al. | 364/138 X |
| 4,387,434 | 6/1983 | Moncrief, Jr. et al. | 364/509 |
| 4,418,381 | 11/1983 | Molusis et al. | 364/131 |
| 4,424,559 | 1/1984 | Lorincz et al. | 364/138 X |

OTHER PUBLICATIONS

Godsey—"Microprocessor Controls Remote Pipeline Sites"—*The Oil and Gas Journal*, Jan. 31, 1977.
Kendall—"New Developments in the Electronic Instrumentation and Control of Gas Pipelines"—*Energy Processing/Canada*, Jan./Feb. 1983.

*Primary Examiner*—Joseph Ruggiero
*Attorney, Agent, or Firm*—Thomas W. Tolpin; William T. McClain; Fred E. Hook

[57] ABSTRACT

Disclosed is a supervisory control system for remotely monitoring and controlling at least one operational device. The system includes at least one microremote in association with an operational device and includes an input device for receiving a signal indicative of a parameter associated with the operational device and logic circuitry for controlling the operation of the microremote. A microcomputer is in communication with the microremote(s) by way of a communication link, and includes input devices for receiving the signal from the microremote, a memory device for storage of a program or algorithm, and a microprocessor for controlling the operation of the microcomputer and for utilizing the program or algorithm for operation of the supervisory control system. A personality module is removably placed in communication with the microcomputer and includes logic circuitry for controlling the operation of the personality module, and a memory device for storage of at least one program or algorithm. The personality module provides the program or algorithm to the memory device in the microcomputer for use thereby to provide supervisory and control directions for operation of the overall supervisory control system.

12 Claims, 14 Drawing Figures

ASC-551 STATUS MODULE DIAGRAM

ASC-555 ANALOG-TO-DIGITAL CONVERTER MODULE DIAGRAM

ASC-556 ACCUMULATOR MODULE DIAGRAM

ASC-554 FUNCTION CONTROL MODULE DIAGRAM

SUPERVISORY CONTROL SYSTEM FOR REMOTELY MONITORING AND CONTROLLING AT LEAST ONE OPERATIONAL DEVICE

BACKGROUND OF THE INVENTION

1. Field of the Invention

The present invention relates to a supervisory control system, and more particularly, to such a system which utilizes microprocessors for remotely monitoring and controlling at least one operational device, such as a valve, pump, or the like.

2. Setting of the Invention

A long progression of automation efforts have been underway in the pipeline industry and in the petroleum industry as a whole to improve operational efficiency and reduce costs. The net result of this is that large quantities of oil or other valuable fluids are unaccounted for or are not accurately measured due to the inaccurateness of measuring devices or the lack of centralized control. To increase efficiencies, various improvements have been made in pipeline equipment and measurement techniques, such as improved turbine meters, prover loops, LACT units, tank gauging devices, and sensing devices which detect differences in gases and fluids that are passed through a pipeline. All of these devices have improved accuracies and reliabilities; however, there is still a problem in developing a centralized supervisory control system which can be installed in remote locations and used with these improved devices to achieve improved pipeline operations.

A centralized supervisory control system can provide the ability to perform many different command functions, report on the status of various devices, read out analog values or levels and accumulator values, and report certain logging information, etc. Most pipelines currently utilize hardwired sequence controllers, wherein all the commands needed in the operation of a facility, such as a pump station, are cooperative and interlocked together to provide the proper starting and shutdown control necessary for safe and proper operation of the facility. Operational device status, pressures, temperatures, meter readings, and other pertinent information are brought to control panels within the hardwired sequence controller and are displayed and recorded as necessary for the local operation of the facility. If a supervisory control system is to be added to such a sequence controller, then additional control relays, status pick up points, and analog and accumulator outputs need to be provided for interconnection to the supervisory control system. This conversion from local control to a centralized or remote control requires costly rewiring. Further, to change the mode of operation in a control system is sometimes a harder task to perform than it would be if an entirely new system was being installed. For example, newer supervisory control systems usually use low-voltage DC, while older controllers use high-voltage AC. Further, in many cases, there are no provisions for or ability to read vital data needed for the operation of the supervisory control system.

As an example, an operator can read a series of temperatures and pressures and tell if an operational device is running in normally acceptable ranges. It is another matter entirely to have the temperatures and pressures read and sent automatically out to a local display unit on a sequence control panel, and it is even more difficult to gather and format that data for transmittal to a remote location for use by a supervisory control system. This problem, plus the need for new and better control equipment, is the reason why field and equipment costs can account for 50% or more of the cost of a modernization program to install a supervisory control system on a typical pipeline facility.

Supervisory control systems which use new microprocessor technology to aid in pipeline control, but which suffer with the drawbacks of older systems are described in "New Developments in the Electronic Instrumentation and Control of Gas Pipelines" by Dr. John Kendall and published in *Energy Processing-/Canada* January/February 1983; and "Microprocessor Controls Remote Pipeline Sites" by Ernest E. Godsey and published in *The Oil and Gas Journal*—Jan. 31, 1977.

Another new supervisory control system is called an AMOCAMS 300 or 600 series system which has been produced by Amoco Pipeline Company and is utilized as a hardwired supervisory control system. The AMOCAMS system has been a very successful control system, but is primarily developed for one installation operability and does not have the expandability and flexibility of operation as is sometimes needed. There is a need for a supervisory control system which can be used with or in replacement of the large number of older systems, be they hardwired masters, remote terminal units (RTU's), and new generation equipment. Further, there is a need for a system based upon a microprocessor which is cooperable and comparable with previously existing systems and whose function is to provide enhanced service or the same service as is being performed by the older units.

In designing supervisory control systems, certain design problems are encountered relating to field installations and environments, such as lightning, extreme temperature variations, inexperienced maintenance personnel, the large number of installations, lack of operating power systems, and lack of suitable communication links.

It has been found that lightning damage is the largest single cause of failure of electronic equipment used in field installations as part of a supervisory control system. The factors that contribute to lightning damage include the use of tall antennas, overhead power lines, underground production equipment, underground conduit cables, as well as underground electrical equipment. Usually, upon installation efforts are made to ensure that all electronic devices interconnected to electronic equipment in a physical way are at the same "ground" potential. If extreme care is not taken at the time of installation, then no matter how well a design has been conceived and no matter how well the unit has been tested, the equipment will not be adequately protected from lightning damage.

Another problem encountered is the extreme temperature variations found in field locations, such as temperature variances from −30° F. up to 130° F. If an electronic device, such as a microprocessor, is packaged in an enclosed housing, the temperature inside the housing due to heat buildup from outside sources can become excessive, and if the internal heat generated by the electronic equipment is added then the combined heat buildup can become intolerable causing premature failure of the electronic device. Also, previous experience has taught that continuous fluctuations in temperature causes undesirable stress in the electrical components, solder joints, and PCB connections.

Another problem encountered is that microprocessors are relatively recent inventions and require highly skilled technicians to troubleshoot. Not only must the technician who maintains the microcomputer be highly skilled, but he also must have the proper test equipment for use in remote field locations. Such technicians are often not available to service remotely located field installations, so unskilled people must be relied upon, and such test equipment is delicate and expensive.

Another problem encountered is that the overall number of electronic components has to be carefully considered in the design of a microprocessor-based supervisory control system. "Off the shelf" control systems are usually compromises in flexibility and expandability, and one must be able to accept the design parameters which are to be implemented due to the aforementioned problems inherent in a typical field installation. Such problems can include mounting the off-the-shelf microprocessor package in an above ground metal enclosure and interconnecting it to outputs of control devices, input/output ports, and various end devices such as pressure, differential pressure, and temperature transducers, as well as turbine meters and control valves. All such connections are different and pose unique problems, which usually cannot be met by an "off the shelf" control system.

Another problem encountered is that power networks are not available in remote locations and if they are available, such as in a production field, are usually, at best, undesirable power source for a supervisory control system. Thus, it is preferable to isolate electronic packages from this power network if at all possible.

Further, another problem encountered is that certain remote terminal units (RTU), used as controllers, communicate with a remotely located host computer that controls the entire system and is located from a few feet to many miles away. There are problems in obtaining "right-of-way" for laying interconnecting cables between the remote installations and the host computer. Further, in a production field, there are also problems of numerous cable cuttings due to normal production field activity. If radio communications are utilized, usually, there is a large power demand which, again, can become dependent upon an unpredictable power network.

There is a need for a supervisory control system which can be easily expanded or added to an existing supervisory control system and which has lightning protection, temperature protection, ease of maintenance, expandability, and flexibility in design, can be isolated from a power network, and can utilize reliable communication links over remote distances.

One supervisory control system which has been developed to control a fluid storage facility and includes microprocessors and devices to protect from power surges is disclosed in Moncrief, Jr. et al U.S. Pat. No. 4,387,434. While the control system of Moncrief is an advancement over prior systems, Moncrief does not disclose or suggest a supervisory control system for use in many different applications and which can communicate to a remote location via a radio communications link, utilizing a power source other than the field power supply, and has a complete separation of the remote located devices from the controller to protect from power surges and transients. The system of Moncrief attempts to address the problem associated with power surges but does not suggest or disclose ways to overcome the other above listed problems associated with field installations of supervisory control systems.

SUMMARY OF THE INVENTION

The present invention is a supervisory control system for remotely monitoring and controlling at least one operational device and which is contemplated to overcome the above described problems and deficiencies. The system of the present invention includes at least one microremote in association with an operational device, such as a valve or pump, and includes (a) an input device for receiving a signal indicative of a parameter associated with and from an output of the operational device, (b) and logic circuity for controlling the operation of the microremote. The microremote is a standalone unit with its own logic circuitry but is controlled by a microcomputer in communication with the microremote(s) by way of a communication link. The microcomputer includes input devices for receiving a parameter signal from a microremote, a memory device for erasable storage of programs or algorithms, and a microprocessor to control the operation of the microcomputer, as well as to utilize a program or algorithm for operation of the overall supervisory control system. A personality module is placed in communication with the microcomputer and includes logic circuitry for controlling the operation of the personality module and also includes a memory device for storage of at least one program or algorithm. The personality module, upon command from the microprocessor, provides the stored program or algorithm to the memory device within the microcomputer so that the program or algorithm can be utilized to provide supervisory and control directions for operation of the overall supervisory control system.

In one embodiment of the present invention, the microcomputer includes devices and circuitry for generating an operational control directive in response to the signal from the microremote and providing the directive to the microremote through the communication link. The microremote then receives this directive and communicates this directive to a device for effectuating change in the operating device, for example opening or closing a valve.

In one embodiment of the microcomputer, the device for receiving the signal and the personality module are mounted within an above-ground housing, while the memory device and the microprocessor are mounted within a sealed below-ground housing, with the two housings operatively connected together by a shielded electrical cable.

DETAILED DESCRIPTION OF THE PREFERRED EMBODIMENTS

Figure 1:
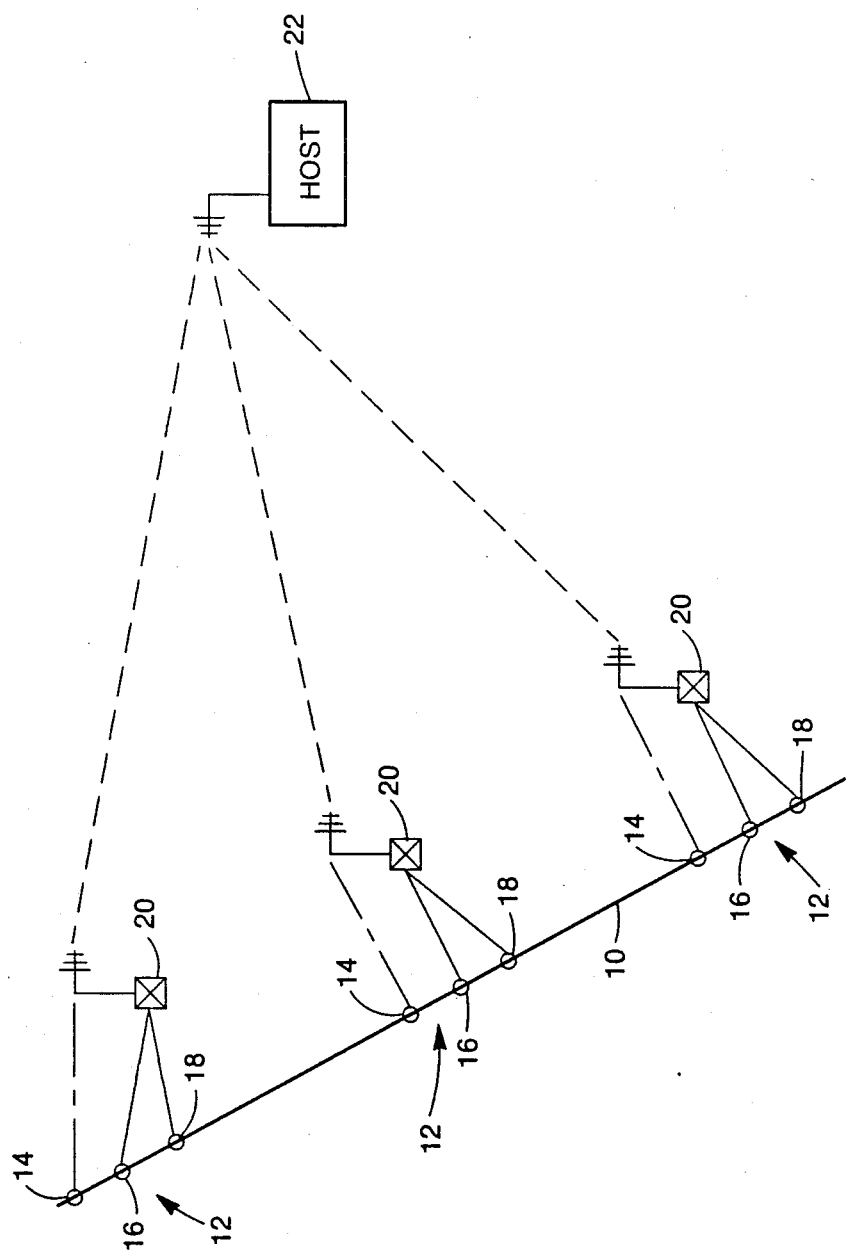
FIG. 1 is a diagrammatic representation of a pipeline being monitored and controlled by microremotes and microcomputers, in accordance with the present invention.

The present invention relates to a supervisory control system which performs monitoring and control operations at a multiplicity of remote locations under the control from a microcomputer installation, and which can further transmit data to and receive command instructions from a host computer. The system is particularly useful where relatively large distances separate the points at which monitoring measurements and control operations are made; for example, in a gas or oil well field, on certain land or offshore drilling rigs or production facilities, or in extended fluid pipeline systems. The system also has utility where the monitoring and control points are not widely separated but where the installation of connecting wiring is expensive or impractical. For example, the system can be used to monitor and control individual fuel dispensers in a service station without the necessity of laying electrical wires beneath concrete. Intermediate to these extremes, the system can have great utility in providing centralized monitoring and control in refineries, offshore platforms, chemical or petrochemical plants, water injection controllers, nitrogen water, and $CO_2$ injection controllers, and the like.

The system includes at least one microremote in association with an operational device and includes (a) an input device for receiving a signal indicative of a parameter associated with the operational device and (b) logic circuitry for controlling the operation of the microremote. A microcomputer communicates with the microremote by way of a communication link, such as fiber optic cable, coaxial cable, phone line, radio, or combination of those, and includes (a) input devices for receiving the signal from the microremote, (b) memory devices for erasable storage of programs or algorithms, and (c) a microprocessor for controlling the operation of the microcomputer and to utilize the program or algorithm for operation of the overall supervisory control system. A personality module is placed in communication with the microcomputer and includes (a) logic circuitry for controlling the operation of the personality module and (b) a memory device for storage of the program or algorithm. The personality module provides the program or algorithm to the memory device within the microcomputer so that the program or algorithm can be utilized to provide supervisory and control directives for operation of the overall supervisory control system.

As used throughout this discussion the following terms shall have the following means. "Operational device" means a control device such as a pump, valve, gate, relay, switch, and the like, and/or a status reading device such as a flow meter, tachometer, temperature probe, pressure transducer, current load gauge, load cell, and the like. "Signal" means an electrical signal in the form useable by a hardwired circuitry unit, such as a microprocessor or computer. "Parameter associated with the operational device" means status readings or outputs such as ON/OFF, position, condition, functionality, and/or value readings such as flow rate, RPM, temperature, pressure, current load, weight, etc.; all either in digital or analog format. "Program or algorithm" means an application computer program which can contain any number of algorithms, and which is stored in association with and utilized by a microprocessor or computer. The programs or algorithms utilized within the present invention are typical supervisory control programs that are used widely within the particular industry. Since the coding of such programs would be and are well within the expertise of one skilled in the art, such code will not be provided herein.

To aid in the understanding of the present invention, reference is made to the accompanying drawings. One embodiment of the present invention is provided in FIG. 1, wherein a fluid transport pipeline 10 such as an oil, petrochemical products, or coal slurry pipeline is to be monitored and controlled by a supervisory control system of the present invention. Spaced along the pipeline 10, from a few feet away or up to many miles distant are a plurality of pump stations 12 which include a plurality of operational devices. In this embodiment, the operational devices are a valve 14, a pump 16, and a flow meter 18. Connected to each operational device is a microremote (not individually shown) which receives a signal indicative of a parameter associated with the operational device. For example, a switch layout, relay setup, or a transducer can be connected to the valve 14 such that the signal sent to the microremote (usually by way of an electrical cable) represents the open/closed position of the valve 14. Likewise, a signal from the pump 16 can represent its status, i.e., ON-OFF, current load, temperature, RPM, etc., while a signal from the flow meter 18 can represent the fluid velocity through the pipeline 10.

A microcomputer 20 is in communication via a communication link with the microremotes. The communication link can be fiber optic cable, coaxial cable, phone line, radio, or combination of these as desired by the operator. Usually, if short distances separate the microremotes from the microcomputer, then fiber optics or coaxial cable will be used. If longer distances are encountered or if laying underground cable is impractical, then phone lines or radios can be used. Each of the microcomputers 20 can be in communication, via the same communication link, with a remotely located host computer 22, either another microcomputer or a mainframe computer which monitors the overall or a large segment of the operation of the pipeline 10.

In the operation of the pipeline 10, the program or algorithm stored within each microcomputer causes an interrogation signal to be sent to selected or all of the microremotes that each microcomputer monitors. The signals received back from the microremotes in response to these interrogation signals are then utilized within the microcomputer to calculate or determine if any corrective action is required. For example, the program can be used to read flow meter readings and if such readings are outside of a preset limit, then corrective action can be initiated. If corrective action is required (as determined by the program within the microcomputer) then a directive is sent by way of the communication link back to the selected microremote. The microremote then causes the directive to pass to a control device connected to the appropriate operational device to effectuate the desired change. For example, the directive can be sent to a solenoid device attached to the valve 14 or a speed controller of the pump 16 to change the position of the valve 14 or alter the speed of the pump 16.

The microremotes communicate to the microcomputers, the host computer 22, to each other, or the microcomputers to the host computer 22 continuously, at preset intervals, or only when polled or interrogated by the host computer 22. At the facility where the host computer 22 is installed, an operator is provided with command of the pipeline operation via data sent from the microremotes to the microcomputers and on to the host computer 22. If some overall corrective action is desired, the host computer 22 can communicate such action in the form of a directive, sent by way of the communication link, to the microcomputers and to the selected microremotes, and eventually to the desired operational device(s).

Figure 2:
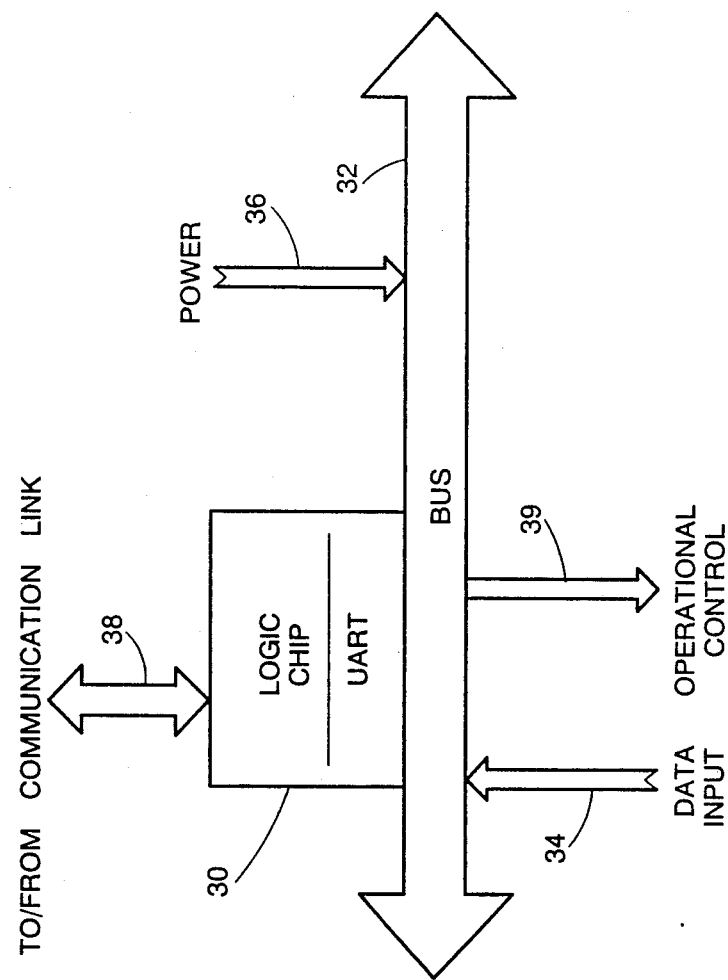
FIG. 2 is a diagram of the hardware architecture of a microremote.

To better understand the uniqueness of the present invention, a description will be made of each component herein below. Each microremote (as shown in FIG. 2) includes a logic circuit chip 30, which contains an algorithm and is connected to a two-way address and data I/O bus 32. The signals from the operational device(s) are provided to the bus 32 through a data input port or connection 34 and are then acted upon as determined by the algorithm stored in the chip 30. The microremote preferably includes an analog-to-digital converter (not shown) to transform an analog signal from an operational device to digital format for use by the chip 30. Suitable electrical power, such as 6, 8, or 15 VDC, from a power line, battery, solar panel, wind generator, combinations of these, or other source is provided to the chip 30 through a power connection 36 on the bus 32.

The chip 30 contains or is connected to a universal asynchronous receiver transmitter (UART) which is used to take the signal as x parallel data words and transform it into a single line of x bits in length, i.e., serially, and visa versa. The UART acts as a command and protocol interface with the microcomputer and provides address and command recognition. One benefit of using serial communication is that only two wires are required to connect any two components or devices to the chip 30 rather than a multitude of wires all connected to the chip 30; this helps ensure electrical noise isolation for the chip 30. Further, the UART includes within the data words certain framing instructions, as well as a data error or "parity" bit. The serially transformed signal is then outputted to the microcomputer through a communication input/output 38 to the communication link.

The communication link, as described previously, can be a phone line or radio transceiver which requires the use of frequency shift key (FSK) modem within the microremote and the microcomputer, and/or by coaxial cable or optical fiber, which includes an optical isolation device, such as an optocoupler (not shown) to provide electrical isolation to the chip 30. Directives from the microcomputer pass through the communication input/output 38 and are transformed by the UART, acted upon by the algorithm within the chip 30, and are then passed to the operational device through an output 39.

Each microremote includes a "universal" mother board (ASC-552) and/or a relay mother board (ASC-553). The universal mother board provides terminal strip connection points for the communication link 38, the power input 36, and up to 16 inputs/outputs. The universal mother board also provides a voltage regulator, an edge connector used for connection of other microremote modules, and two 600 ohm transformers if a FSK modem is used. Further, transient protection is provided by a standard resistor setup, a MOV, fuses, or a tranzorb.

The relay mother board (ASC-553) provides terminal strip connection points for the communcation link 38, the power input 36, and up to eight relay contact outputs (39) for delivering operational control directives to the operational devices. The relay mother board also provides a voltage regulator, an edge connector, and two 600 ohm transformers if a FSK modem is used. The relay mother board also has the same types of transient protection as described for the universal mother board (ASC-552).

Figure 3:
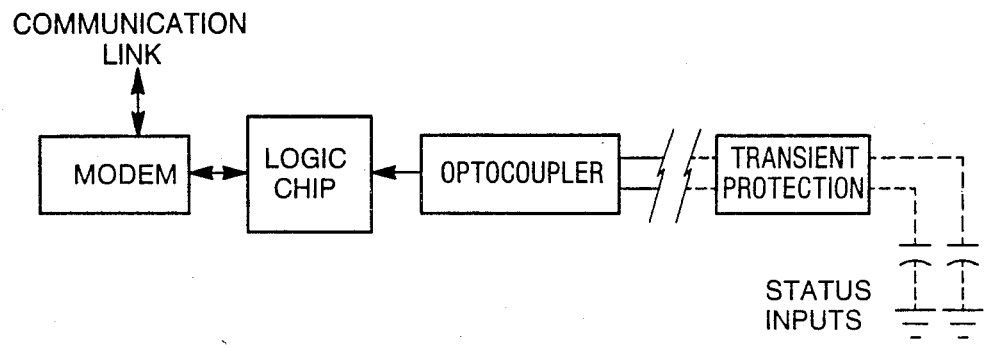
FIGS. 3–6 are diagrams of the hardware architecture of individual modules which can be included within the microremote to perform a specific function.

A status module (ASC-551) can be connected to the universal mother board (ASC-552) and contains all of the hardware necessary for connection of the chip 30 to the communication link 38 and can communicate with a microcomputer or directly to a host computer 22 at data speeds up to 19.2K baud. The status module, as shown in FIG. 3, provides up to 16 status or data inputs (34) which can be optocoupled, usually with a minimum of about 1500 VDC isolation, to provide electrical isolation for protection of the system from transients.

Figure 4:
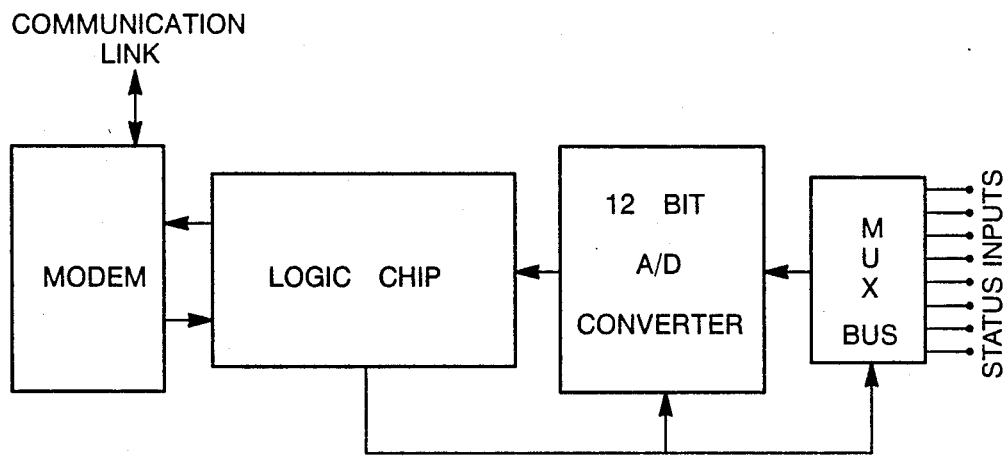

An analog-to-digital converter module (ASC-555), shown in FIG. 4, can be connected to the universal mother board and by using a logic chip provides digitizing of up to eight 12 bit analog channels, usually with the impedance for each channel being greater than about one mega ohms. The analog status or data inputs are preferably bipolar and can each accept a maximum of ±4 VDC input for a full-scale hexidecimal output.

Figure 5:
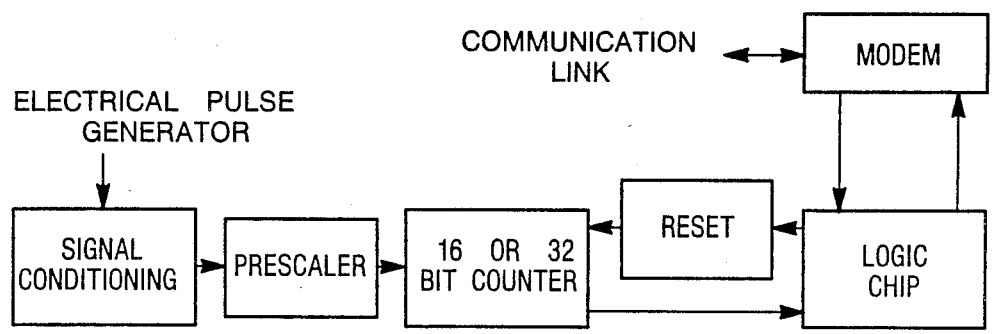

An accumulator module (ASC-556), shown in FIG. 5, can be connected to the universal mother board and by use of a logic chip, provides accumulating for one of the following combinations of status or data inputs from an operational device: four 16 bit binary accumulators, two 32 bit binary accumulators, one 32 bit and two 16 bit binary accumulators, or one 32 bit or two 16 bit binary accumulators. The counters are software resettable (32 bits at a time) and the signal input may be prescaled to a divide by a factor of 1, 10, $10^2$, $10^3$, and $10^4$. The accumulators are used for gathering an average or total summation of data readings from an operational device, such as a flow meter or tachometer.

Figure 6:
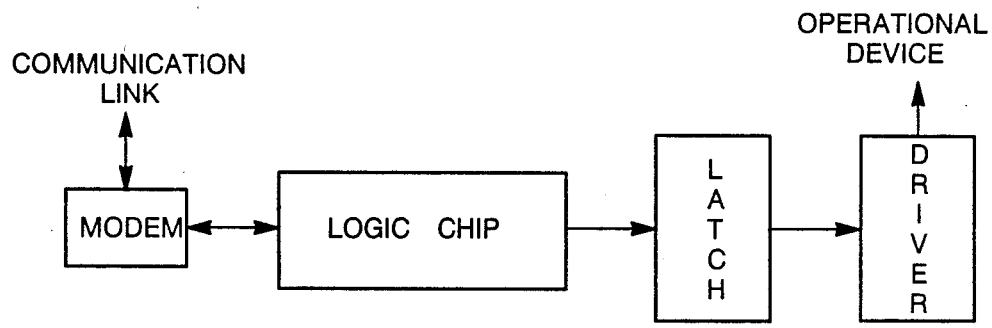

A function control module (ASC-554), shown in FIG. 6, can be connected to the relay mother board for controlling, by use of a logic chip, up to 8 SPST relays for use in sending directives to the operational device(s). The directive to each relay can be implemented by a momentary contact refreshed periodically to keep the relay contact closed, or a latching relay contact controlled entirely by the program or algorithm within the controlling microcomputer.

Figure 7:
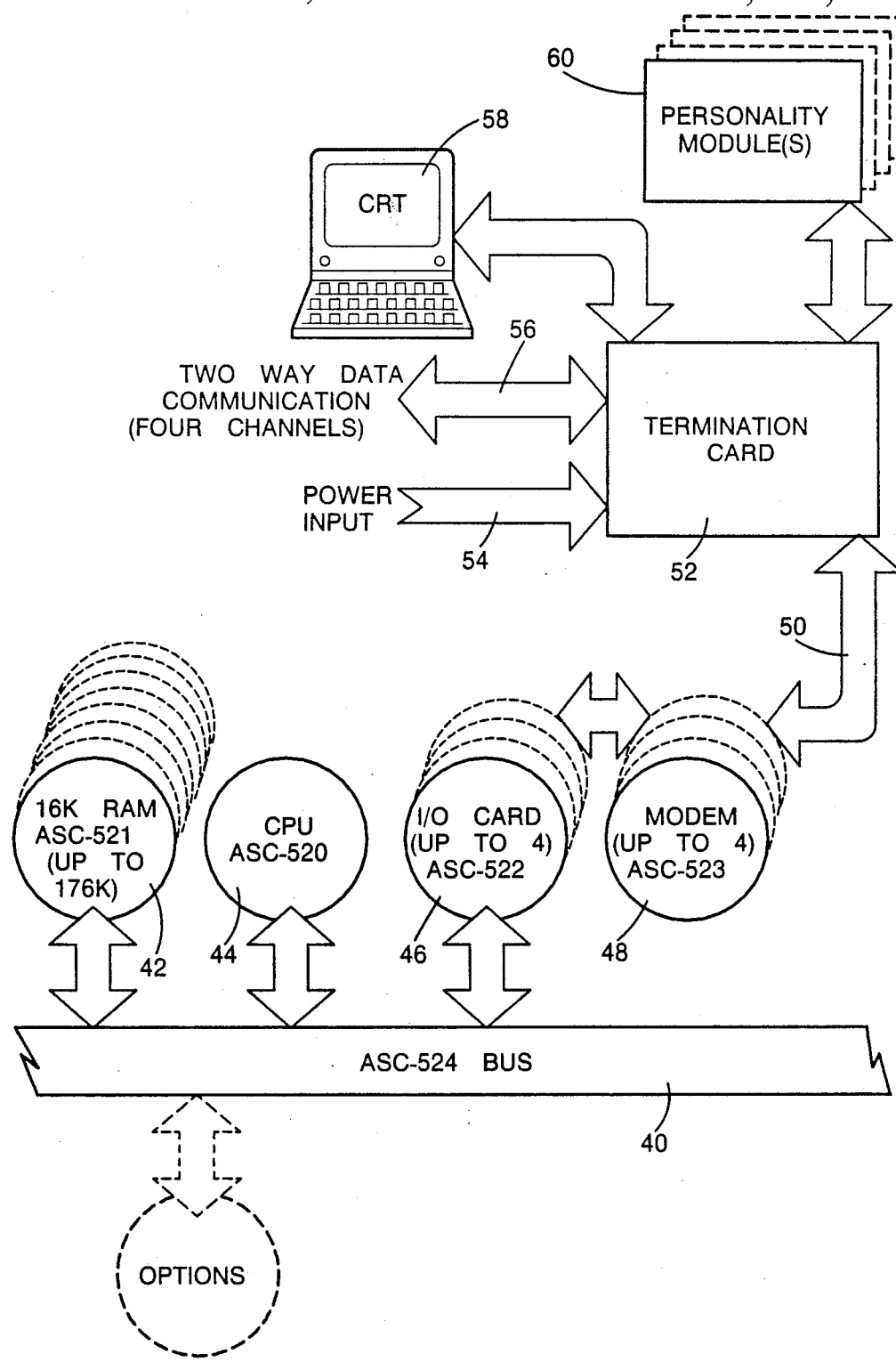
FIG. 7 is a diagram of the hardware architecture of a microcomputer.

Now that the microremote and its various features has been discussed, the microcomputer can be described in detail. As shown in FIG. 7, the microcomputer is comprised of an address and data I/O bus 40 (ASC-524) to which is connected at least one memory card 42 (ASC-521), a microprocessor card 44 (ASC-52), at least one I/O controller card 46 (ASC-522), and a communications modem card 48 (ASC-523). A shielded electrical cable 50, which has up to 25 leads, interconnects the bus 40 through the I/O controller card 46 with a separately located termination card 52. The termination card 52 provides separate interconnection points for a power input 54 from a battery, solar panel, wind generator, power line, or the like; input/output port 56 for portions of the communication; a computer console 58

(if desired for operator set up, diagnostic work, or on-location control of the microcomputer); and at least one personality module 60, which will be described in detail later.

The bus 40 (ASC-524) connects the cards together and provides data paths between cards and power to each. To the bus 40 can be connected to up to four (ASC-522) input/output cards 46 with up to four (ASC-523) modem cards 48 connected thereto. These cards can be used in various configurations, such as four FSK modems, four optocoupler channels, or a combination of FSK modems and optocoupler channels. If more than four serial channels are needed, an expanded bus 40 and a second termination card 52 can be used. Each input/output card 46 is connected to a specific modem or optocoupler interface by electrical jumpers on the input/output card 46. The output of each modem card 48 is connected to the termination card 52 by jumpers on the modem card 48, and these jumpers connect the output of each modem or optocoupler interface with the cable 50.

Figure 8:
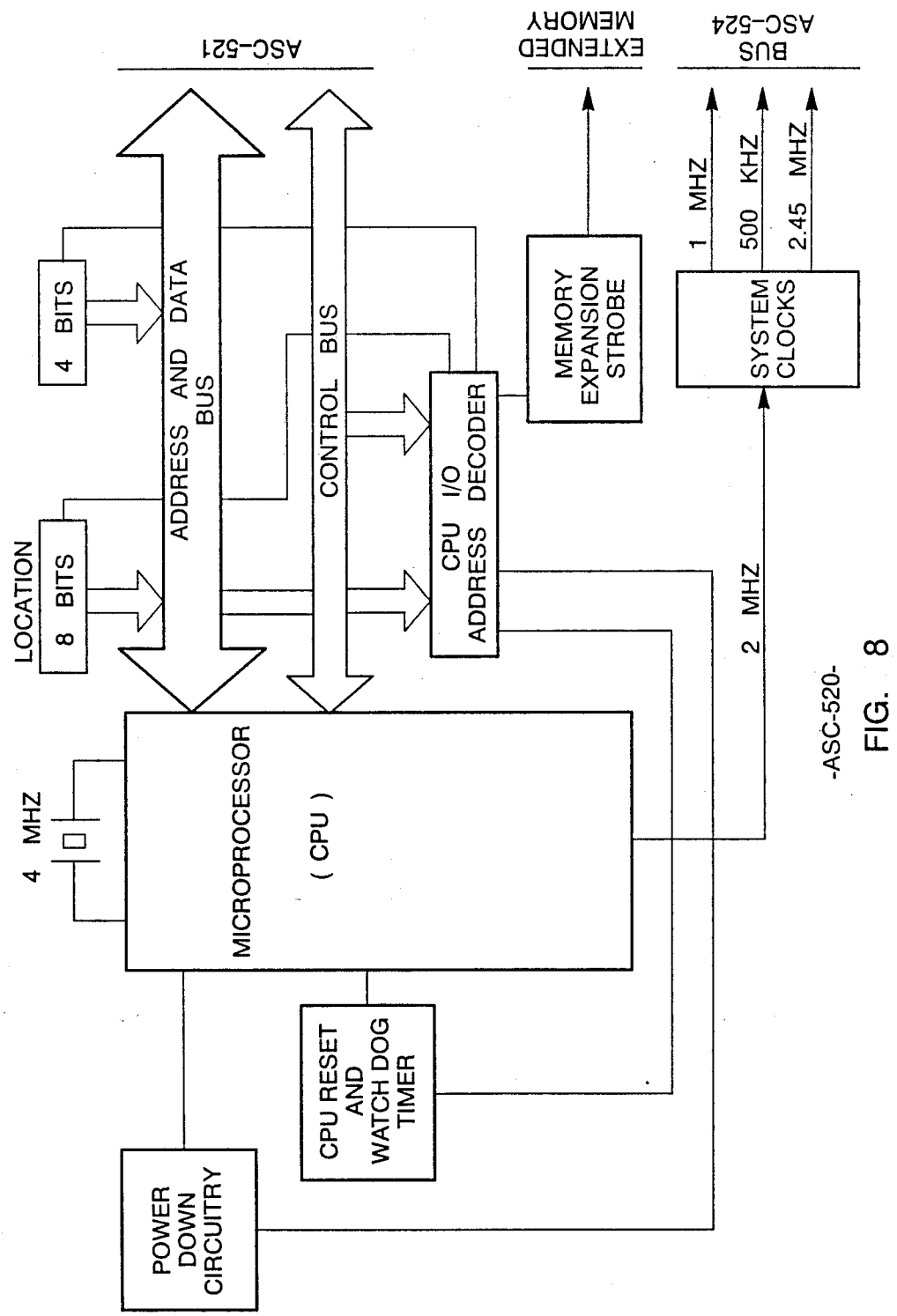
FIGS. 8–11 are diagrams of the hardware architecture of circuit cards included within a microcomputer.

The microprocessor card 44 (ASC-520) is the "heart" of the overall system, and, as shown in FIG. 8, includes a microprocessor, such as a CMOS National Semiconductor NSC-800 which utilizes a Zilog Z-80 instruction set. In one embodiment, the microprocessor can directly access up to 64K bytes of memory; however, with a paging extended memory scheme it can access up to 176,000 bytes in 16K byte blocks. The microprocessor card 44 includes an address and data bus as well as a control bus for interconnection to the memory card(s) 42 (ASC-521). The microprocessor includes code to generate a system clock signal, sent through the bus 40 to be used by the other cards in their individual operations. Further, the microprocessor card 44 includes a power down circuit so that at the end of each command or program run the electrical power to the CPU is essentially turned off and will not be restored until receipt is made of a correct interrupt signal, i.e., from an external source or from the system clock. This feature reduces the power requirements of the CPU sometimes by a factor of 10:1.

Figure 9:
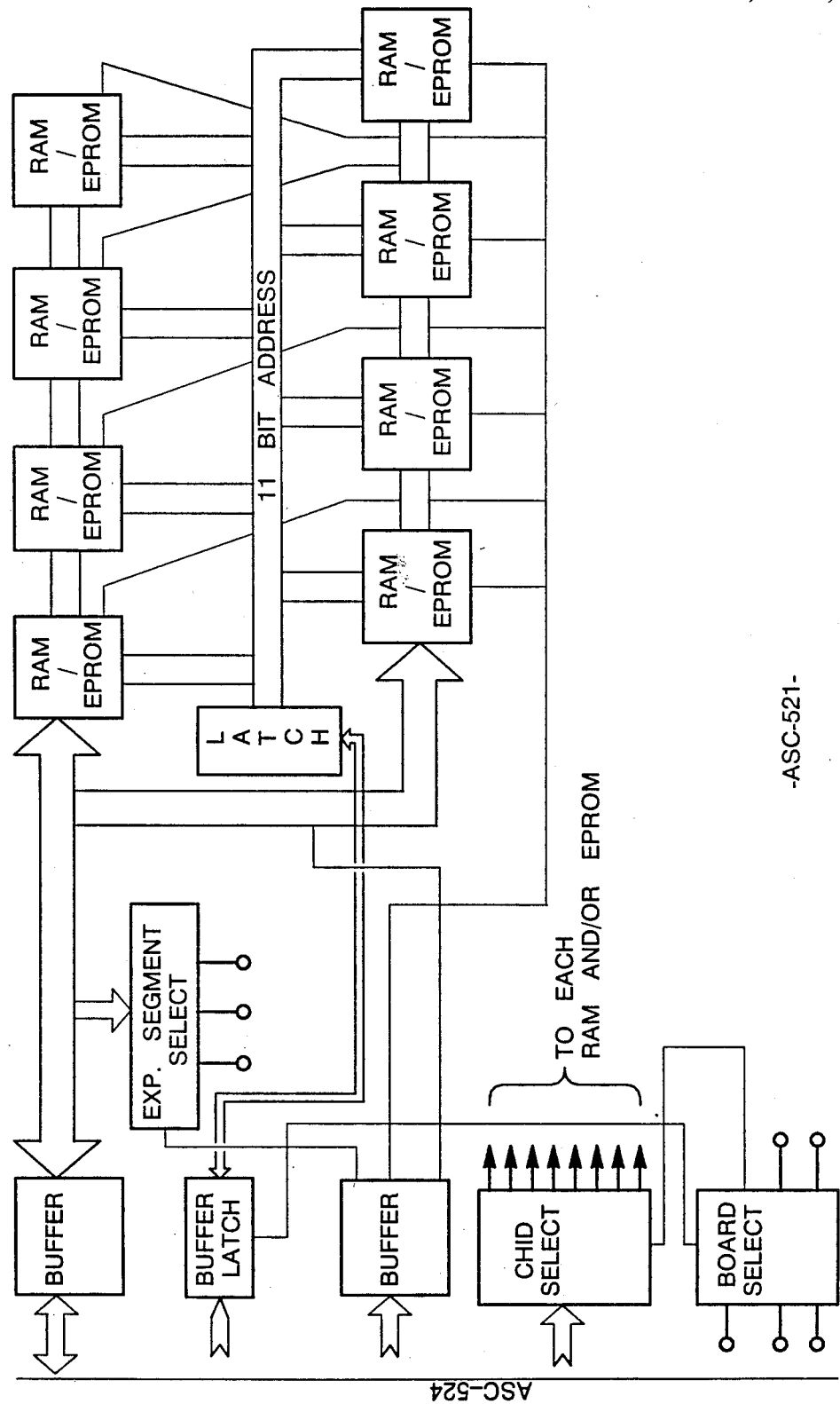

The memory card 42 (ASC-521) provides residency for 16K bytes of memory in 6166, byte wide asynchronous RAM and/or 2716 byte wide EPROM for storage of command logic but also the storage of the application program or algorithm provided by the personality module 60. The memory card 42, as shown in FIG. 9, includes a bus buffer, board decoding section, and the memory chip array, and with proper jumpers, up to 11 memory cards 42 can be utilized. The microprocessor is usually rated to drive 100 pf of capacitance on each of its address, data, and control lines; however this limit can be easily exceeded, so to minimize the loadings to one chip load per line per board, the lines on the memory card 42 are buffered and can include pull down resistors to minimize line noise. Proper memory card and memory chip selection is performed by decoding the most significant address bits in each word. The address is latched into the decoding circuitry from the address/data I/O bus 40. The decoders hold this address, and the resulting memory chip is selected, until a new address is issued by the microprocessor (CPU).

Figure 10:
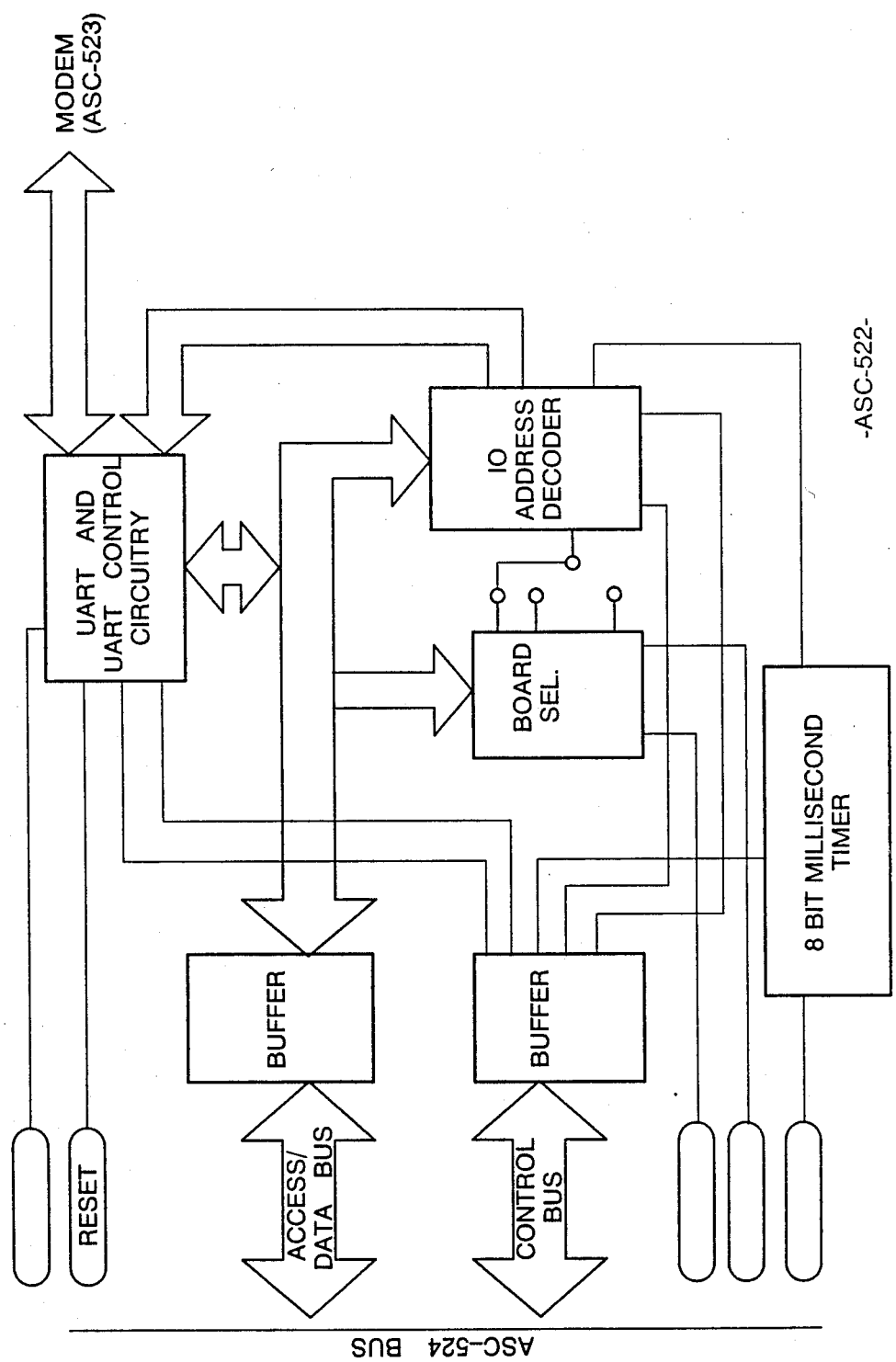

The I/O card 46 (ASC-522) includes, as shown in FIG. 10, two major sections: a serial interface and a millisecond timer. The serial interface includes the required circuitry to operate an interrupt driven asynchronous serial communication channel using a UART. The millisecond timer is included for use as a timing carrier when the FSK modem is used with a radio or phone line communication link. When this timer is not needed for delay timings, it is available for general purpose timing applications. The millisecond timer is utilized with the FSK modem to cause the carrier to turn on and allows the FSK receiver to synchronize on the transmitter carrier frequency and a carrier turn off-/delay assures that the last word from the UART is received properly. The delay times are usually between 25 and 125 millisecond depending upon the communication link used.

Figure 11:
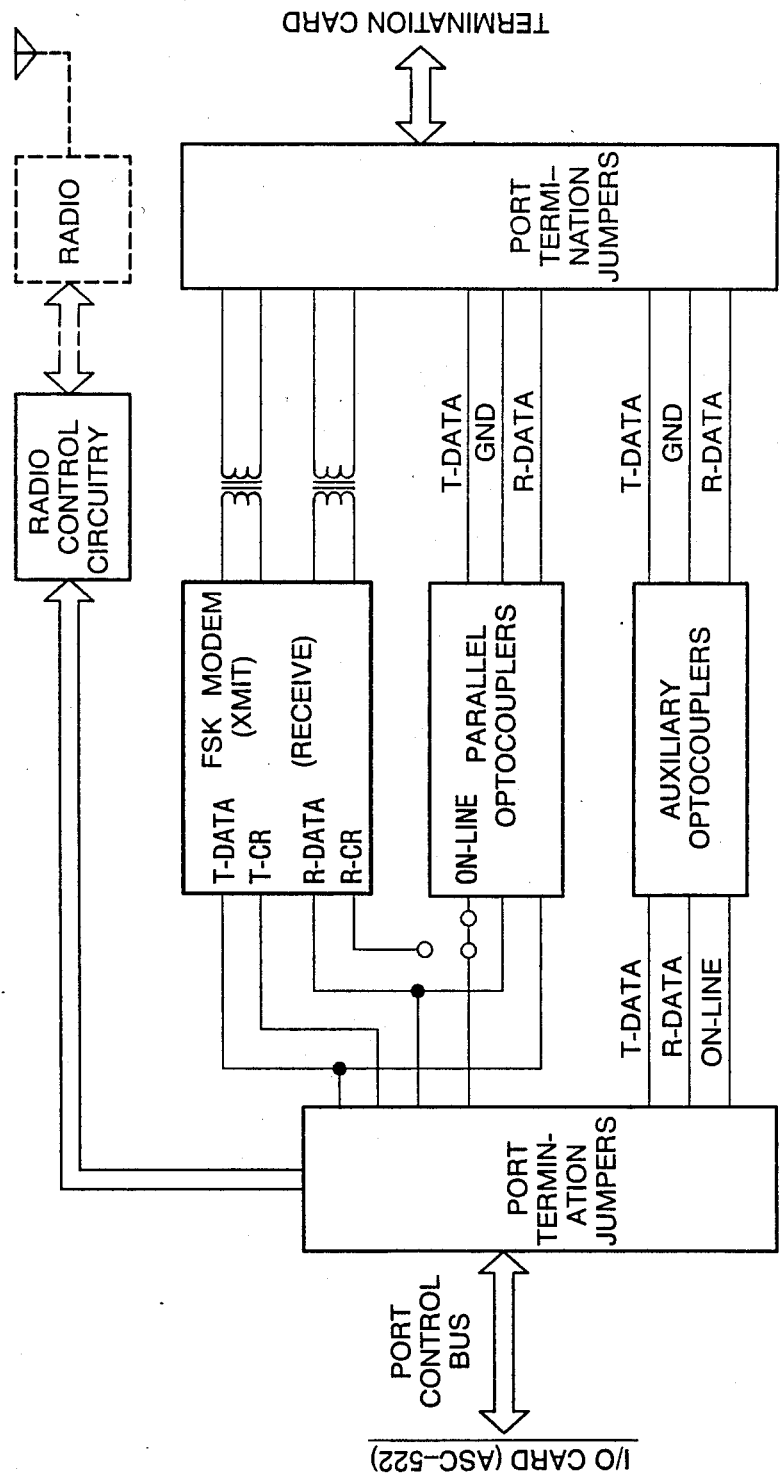

Up to four modem cards 48 (ASC-523), shown in FIG. 11, can be interfaced with the input/output (I/O) card 46 for use with different types of peripheral devices, such as a 600 baud FSK modem, phone lines and radios, and optocoupled peripherals, including local microremotes and all standard RS 232 interface devices, such as printers and CRT's. One embodiment of the modem card 48 includes a transceiver FSK modem with a set of optocouplers set in parallel with it. A second optocoupler interface is provided to interconnect to an I/O card 46 (ASC-522) separated from the I/O card connected to the FSK modem. A second interface can be used for local data acquisition and control with an optocoupler linked microremote or RS-232 connected printers or CRT's. The modem card 48 can include an FSK modem, optocoupler, auxiliary optocoupler interfaces, port termination jumpers, and a port control bus. The FSK modem receiver is based upon a single chip decoder and the transmitter is crystal controlled and requires no adjustment. In one embodiment, the FSK modem operates at 600 baud and can be set to operate with a variety of frequencies with 400 hertz shift. The FSK modem's radio interface provides the power and control signals for a 1 watt transceiver which operates over 1000–1400 Hz or 2273–2632 Hz from an 8 VDC power source. The FSK modem is primarily intended for communication with the microremotes over a long distance, greater than a few hundred feet and is usually limited to about 600 baud, However, higher speed interfaces are available through the optocouplers which are capable of operating at up to about 19,200 baud.

A voltage controller card (not shown) (ASC-525) is connected to the bus 40 and the termination card 52 through the cable 50 and provides the various voltages needed to operate all components of the microcomputer. Most of the logic-type cards operate at 5 VDC and the radio transceiver, if needed, operates at 8 VDC. The usual power input is 15 VDC which is reduced by a regulator to the required lower voltages and then electrically connected to the appropriate device(s). The voltage regulator card also provides additional protection against power surges and transients in three ways: the 15 VDC input lines are fused, the charger inputs from a battery charger; such as solar panel, is bypassed with 0.1 pfd capacitors; and a tranzorb is placed across the 15 VDC line and fully grounded. In addition, two inductors can be added in-series with the 15 VDC input lines from the terminator card 52 to provide enhanced high frequency transient protection.

Optional cards which can be connected to the bus 40 include a disk drive interface, a math card, quad optocoupler interface, and an expanded memory card.

The personality module 60 electrically interconnects with the termination card 52 and includes a hard-wired logic circuitry or chip which includes a UART for serial communication with the microcomputer, and memory devices, such as (4K×8) EPROMS. The logic chip contains the necessary control logic for the operation of the personality module, and the EPROM contains at least one program or algorithm to be used by the microprocessor. The algorithm is usually about 48K bytes long; however, for longer algorithm, additional personality modules can be interconnected. The program or algorithm is provided to the memory card(s) 42 (ASC-521) for use by the microprocessor to control the overall operation of the supervisory control system. It should be understood that the microcomputer's memory and functionality is not set up, i.e., is empty, upon installation, but when power is provided to the system and a personality module 60 is inserted into the termination card 52, the program or algorithm within the EPROM of the personality module is downloaded at 19,200 baud to the memory card(s) 42 for storage and eventual use by the microprocessor (CPU). This feature is unique because the personality module is programmed for, and stays with, a particular application, such as a $CO_2$ injection arrangement. The "generic" microcomputer then can be mass produced, installed, and relocated easily for ease of construction, maintenance, and reduction of spare parts. It should also be understood that the same microcomputer package can be used to accomplish many different tasks with no change in hardware within the microcomputer package. The changes that occur are the change in the personality modules associated with a particular application.

All communications within the microcomputer are performed serially using an asynchronous HD 6402 as an UART set up to transmit a 7 or 8 bit data word with one start, stop, and parity bit. Either even or odd parity can be selected and the UART can operate at a baud range of up to 19.2k baud. A baud rate generator provides clocks of 0 to 19.2 bauds, and zero baud is provided as a power down feature so that when there are not outstanding read or write operations for the I/O port, the baud rate generator is set to zero baud, which turns the I/O card baud rate generator chip off in order to save power. Again, all communications sent within the supervisory control system in 7 or 8 bit words, which include a stop, start, and parity or error bit. One example can be as follows:

Word 1—command directed to all microremotes to turn on
Word 2—command directed to all ASC-500 Series microremotes
word 3—command directed to all ASC-500 Series microremotes
Word 4—address (1 to 256)
Word 5—address multiplier (16×256) to reach up to 4096 microremotes
Word 6 to x—command instructions or information request The microcomputer uses an interrupt driven serial input/output structure and the system is a real-time system operating on several input/output requests at the same time. Priority is established by the program or algorithm within the microprocessor (CPU) and the operating system within each logic chip. Serial communication is used for a variety of reasons including the very simple periphery interconnecting wiring and the extremely effective electrical isolation features. As has been described before, all the data gathering and function control peripherals are removed from the microcomputer and this physical separation prevents induced electrical noise from damaging the microcomputer or disturbing bus operations thus increasing system reliability. Having serial communications with the microremotes also allows flexibility in the physical arrangement or replacement of the system components. A very large number, such as up to 4096, microremotes can be controlled by one microcomputer without needing to change the physical size or configuration of the microcomputer.

The microcomputer can also display data in tabular form, issue control function requests, and forward data to another computer, such as the host computer 22. The data displaying control commands are normally accomplished in conjunction with a CRT or printer console 58; however, any serial data display can be used to display data with appropriate software support. Hence, the microcomputer can be used as a stand-alone field remote or remote terminal unit (RTU).

Figure 12:
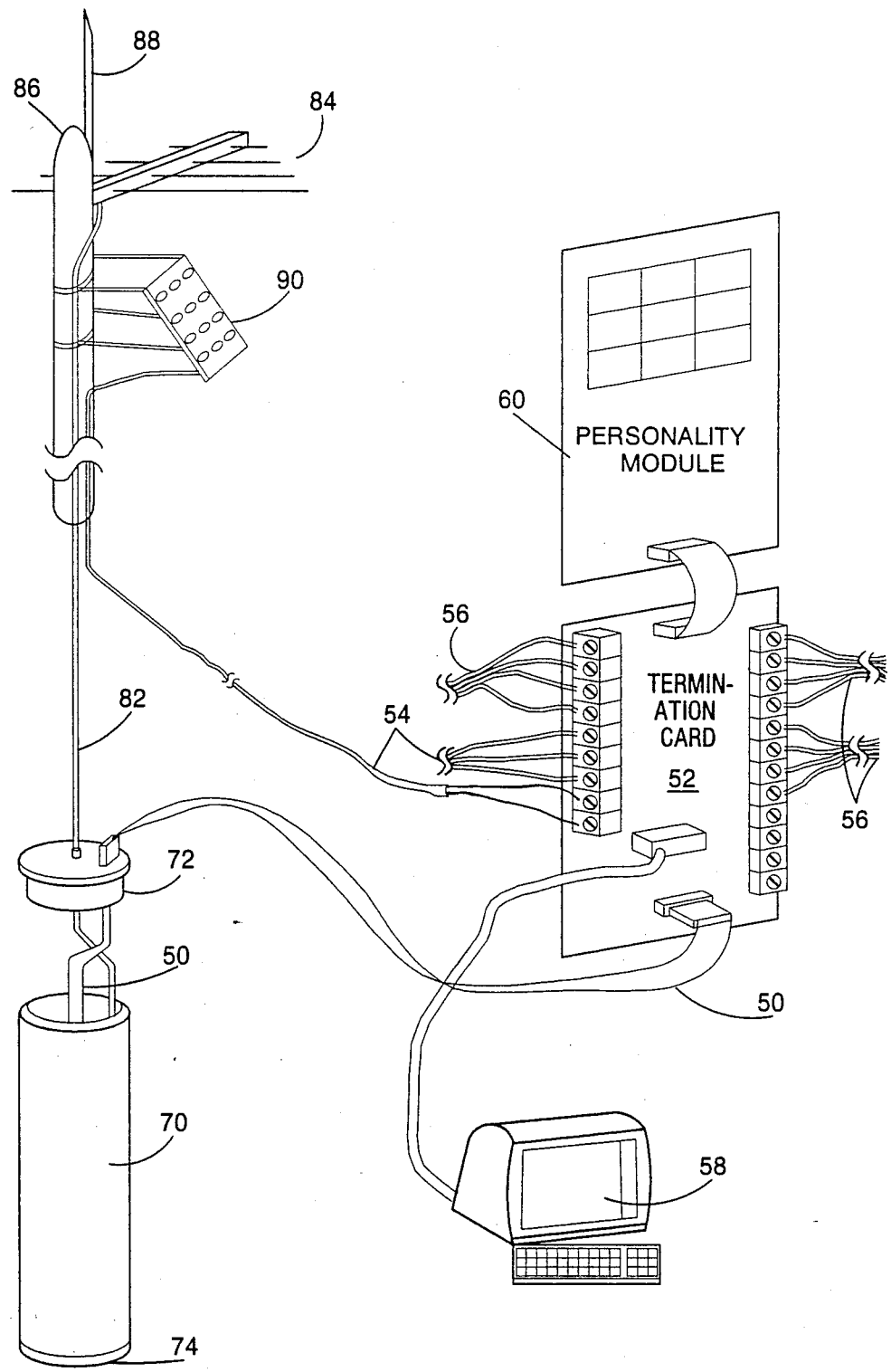
FIGS. 12-13 are semi-diagrammatic representations of a field installation of a microcomputer.
Figure 13:
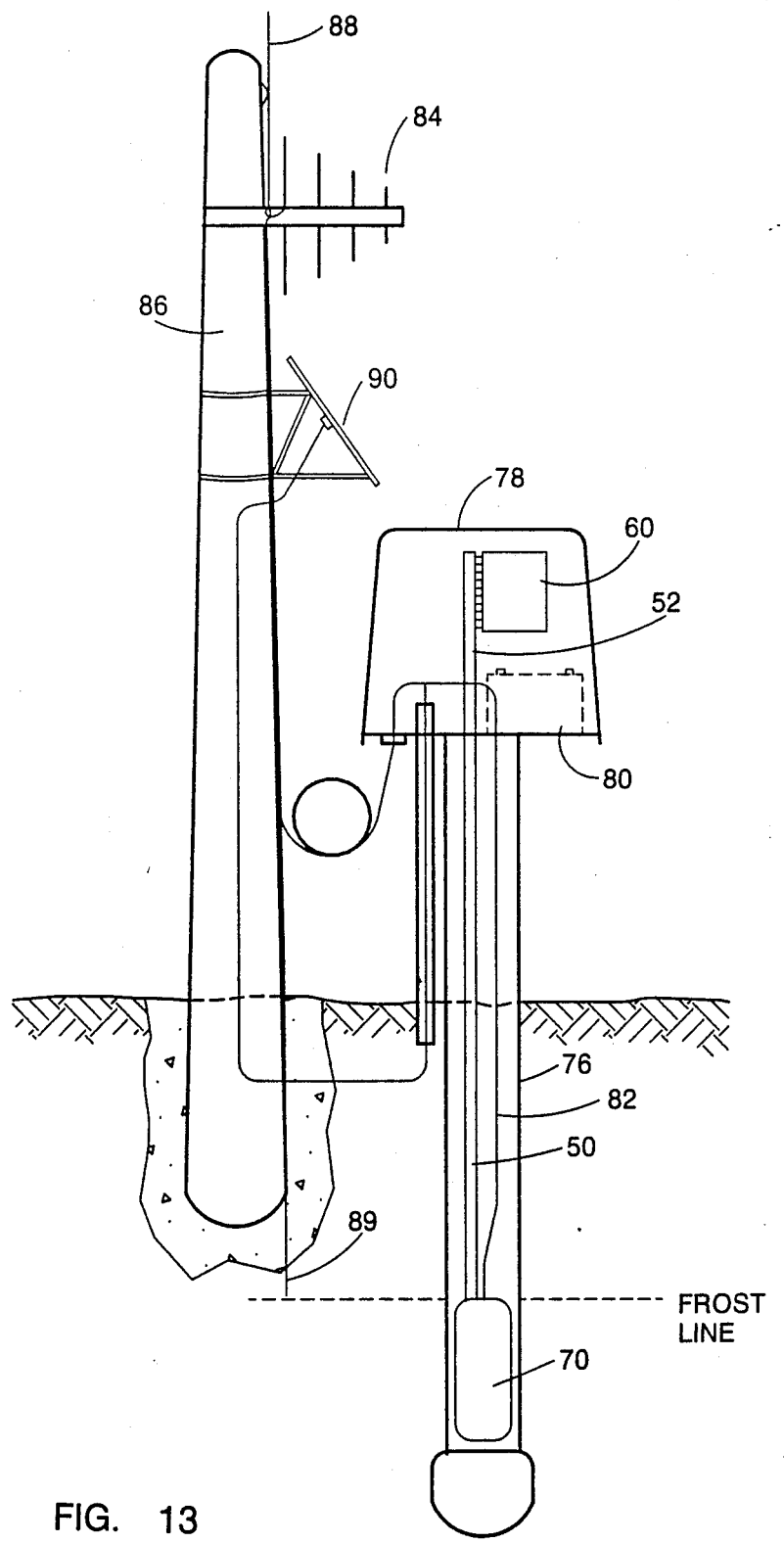

One embodiment of a field installation of the microcomputer is shown in FIGS. 12 and 13. To keep the temperature extremes from adversely affecting the microcomputer, the bus 40 and the cards 42, 44, 46, and 48, all are housed within a sealed container 70 having a top cap 72 and bottom cap 74. The cable 50 extends from the modem card 48 through the top cap 72 and to the termination card 52. The container 70 is inserted into a nonmetallic conduit 76, such as a 6 inch ID Schedule 40 PVC pipe, and suspended at a position below the frost line within the earth. Connected to an upper portion of the conduit 76 which extends a short distance above the ground is a hinged housing 78 in which is housed a battery 80 (if desired), the termination card 52, and at least one personality module 60. The radio transceiver is part of the modem card 48 and is housed within the container 70, so an antenna lead 82 extends therefrom to the housing 78 and out to a directional antenna 84, which is mounted to a pole 86. The pole 86 is cemented into the ground and is provided with a lightning rod 88 connected to a grounding rod 89, which are used for electrical protection from lightening damage. If a suitable power source from a power line is not available then a solar panel 90 or wind generator can be attached to the pole 86 and then interconnected to the battery 80 for use as a trickle charger.

Figure 14:
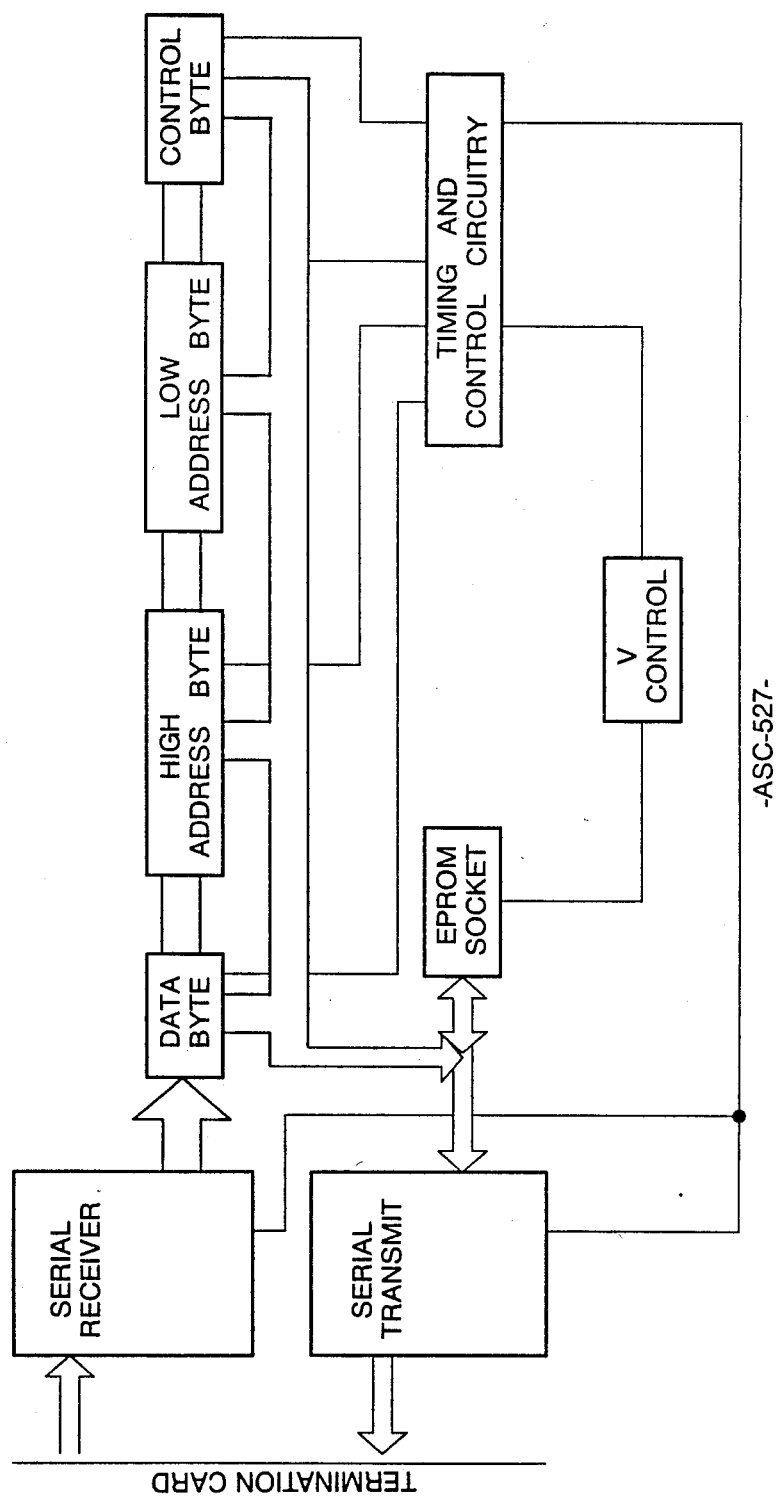
FIG. 14 is a diagram of the hardware architecture of a hand-held reprogrammer.

In the event that the microcomputer requires diagnostic or reprogramming work, the operator can connect a hand-held programmer board (ASC-527) into the termination card and can reprogram an EPROM within the personality module 60. The ASC-527, as shown in FIG. 14, is a serial interface peripheral device which uses a RS-232 communication link and can program any EPROM with the proper jumper connection one word at a time or read an EPROM one word at a time. This feature eliminates the need of changing the personality module 60 if an updated algorithm is to be installed in the microcomputer.

The present invention can be utilized in pipeline operations, fluid level control and fluid distribution through tank farms, refineries, and offshore production platforms. Also, the present invention can be utilized as a nitrogen, $CO_2$, or water injection controller, and the like. Pipeline use for the present invention also includes odorant injection control, and cathodic protection modernizing.

In cathodic protection, a microremote with a low wattage radio can be placed at each rectifier unit and other points, and the operation of each rectifier unit can be monitored each time a pipeline patrol flies over the line. A microcomputer (the same as described above and with a special personality module) in the plane scans the microremotes by radio and records the received data signals and then passes off the data via radio to selected locations on the ground where other microcomputers are located. This data can then be printed out for use in correcting any problems that may have arisen.

The system can be used as a part of an emergency shut down system in refineries and pipelines. Other uses include analog accumulator read out capability for barge loading. For example, on barge loading this feature could be used to record data permitting averaging of the temperature of the load. This could be very important because it would prevent the loss of oil due to use of the wrong temperature compensating factors.

Another use of a similar nature is a net-oil computer which can integrate the readings of a water monitor with metered readings to produce a continuous running record of the amount of oil, the amount of water, and the total volume being metered. This can be a tremendous value at many tank farm locations, at LACT units, and other locations. The present invention can further be utilized at service stations to monitor fuel when received, in storage, and sales and transmitting that information back to a central location. This would be utilized to improve inventory control, monitoring and possible theft or other losses, as well as other aspects requiring more closely supervised control.

Wherein the present invention has been described in particular in relation to the drawings attached hereto, it should be understood that other and further modifications apart from those shown or suggested herein, may be made within the scope or spirit of the present invention.

I claim:
1. A supervisory control system comprising:
   (a) at least one microremote in operative communication with outputs associated with an operational device, the microremote comprising:
       input means for receiving a signal representative of a parameter associated with the operational device, and
       logic circuit means for controlling the operation of the microremote;
   (b) a microcomputer in communication with the microremote by a communication link; the microcomputer comprising:
       means for receiving the signal from the microremote;
       memory means for storage of at least one algorithm; and
       microprocessor means for controlling the operation of the microcomputer and for utilizing the signal from the microremote in conjunction with the algorithm for operation of the supervisory control system; and
   (c) at least one personality module in communication with the microcomputer, the personality module comprising:
       memory means having at least one algorithm stored therein for communication to the memory means of the microcomputer, and
       logic circuit means for controlling the operation of the personality module.

2. The system of claim 1 wherein the microcomputer includes means for generating an operational control directive in response to the signal and to provide the directive to the microremote through the communication link, and the microremote includes means to receive the directive and communicate the directive to means for effectuating change in the operating device.

3. The system of claim 1 wherein the communication link provides two way data transfer over a medium selected from the group consisting of fiberoptical cable, coaxial cable, telephone line, radio, and combination of these.

4. The system of claim 3 wherein all communication occurs serially within the system.

5. The system of claim 4 wherein the microremote and the microcomputer each include a UART in conjunction with the communication link.

6. The system of claim 5 wherein the microremote and the microcomputer each include an optocoupler in conjunction with the communication link.

7. The system of claim 5 wherein the microremote and the microcomputer each include an FSK modem in conjunction with the communication link.

8. The system of claim 1 wherein the memory means includes RAM and EPROM.

9. The system of claim 1 wherein the microcomputer is in two way communication with a host computer through the communication link.

10. The system of claim 1 wherein both the means for receiving the signal and the personality module are mounted within an above ground housing, and the memory means of said microcomputer and the microprocessor means are mounted within a below ground housing; the housings being operatively connected by an electrical cable.

11. The system of claim 10 wherein the above ground housing includes a terminatoin card to which is operatively connected the electrical cable and at least one personality module; and the below ground housing includes a two-way address-data-I/O bus to which are operatively connected the memory means, the microprocessor means, at least one I/O control card, and at least one modem card.

12. The system of claim 1 wherein the microremote and the microcomputer are operatively connected to a power source selected from the group consisting of solar, wind, battery, power line, and combinations of these.

* * * * *

UNITED STATES PATENT OFFICE
CERTIFICATE OF CORRECTION

Patent No. 4,573,115  Dated February 25, 1986

Inventor(s) Edwin A. Halgrimson

It is certified that error appears in the above-identified patent and that said Letters Patent are hereby corrected as shown below:

| Patent Column | Line | |
|---|---|---|
| 7 | 36 | "visa versa" should read --vice versa-- |
| 8 | 29 | "one mega ohms" should read --one mega ohm-- |
| 11 | 51 | "word" should read --Word-- |

Signed and Sealed this

Twenty-sixth Day of August 1986

[SEAL]

Attest:

DONALD J. QUIGG

Attesting Officer  Commissioner of Patents and Trademarks